United States Patent
Hayashi et al.

(10) Patent No.: US 7,391,951 B2
(45) Date of Patent: Jun. 24, 2008

(54) OPTICAL FIBER CLEAVER

(75) Inventors: Takehiro Hayashi, Kanagawa (JP); Shinji Nagasawa, Ibaraki (JP); Kazunori Kuramochi, Tokyo (JP)

(73) Assignees: Tyco Electronics AMP K.K, Kanagawa-Ken (JP); TNK Sanwa Precision Co., Ltd., Tokyo (JP)

( * ) Notice: Subject to any disclaimer, the term of this patent is extended or adjusted under 35 U.S.C. 154(b) by 0 days.

(21) Appl. No.: 11/763,629

(22) Filed: Jun. 15, 2007

(65) Prior Publication Data

US 2007/0292092 A1   Dec. 20, 2007

(30) Foreign Application Priority Data

Jun. 15, 2006   (JP)   .............................. 2006-166258

(51) Int. Cl.
*G02B 6/00*   (2006.01)
(52) U.S. Cl. ..................... 385/134; 385/136; 385/137
(58) Field of Classification Search ................. 385/134, 385/136–137
See application file for complete search history.

(56) References Cited

U.S. PATENT DOCUMENTS 6,978,071 B2 * 12/2005 Hwang et al. ............... 385/134

2002/0100356 A1   8/2002 Murakami et al.
2004/0120678 A1   6/2004 Hwang et al.

FOREIGN PATENT DOCUMENTS

| JP | 63021905 U | 2/1988 |
| JP | 63135304 U | 9/1988 |
| JP | 07081970 | 3/1995 |
| JP | 2003165740 | 6/2003 |
| WO | 2005/017584 A1 | 2/2005 |

* cited by examiner

*Primary Examiner*—Frank G. Font
*Assistant Examiner*—Michael P. Mooney
(74) *Attorney, Agent, or Firm*—Barley Snyder LLC

(57) ABSTRACT

An optical fiber cleaver having a main body having a channel, a feed block attached to the main body in the channel, the feed block being operable between a front position and a rear position, a length selector for setting an optical fiber cleaving length, the length selector comprising a scale provided on the main body, a display provided on the feed block, and a position indicator operably associated with the scale, a pair of upper and lower clamps which fasten an optical fiber of an optical fiber when the feed block is located in the front position, a slider, a blade carried by the slider, the blade being configured to form an initial partial cleaving, and a push-up member carried by the slider and configured to bend the optical fiber subsequent the initial partial cleaving of the optical fiber is disclosed.

12 Claims, 14 Drawing Sheets

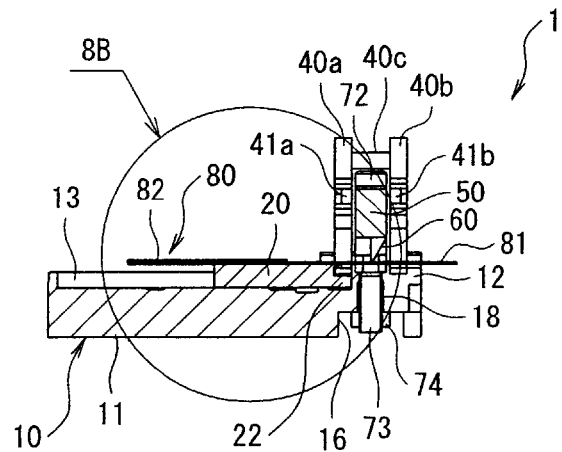
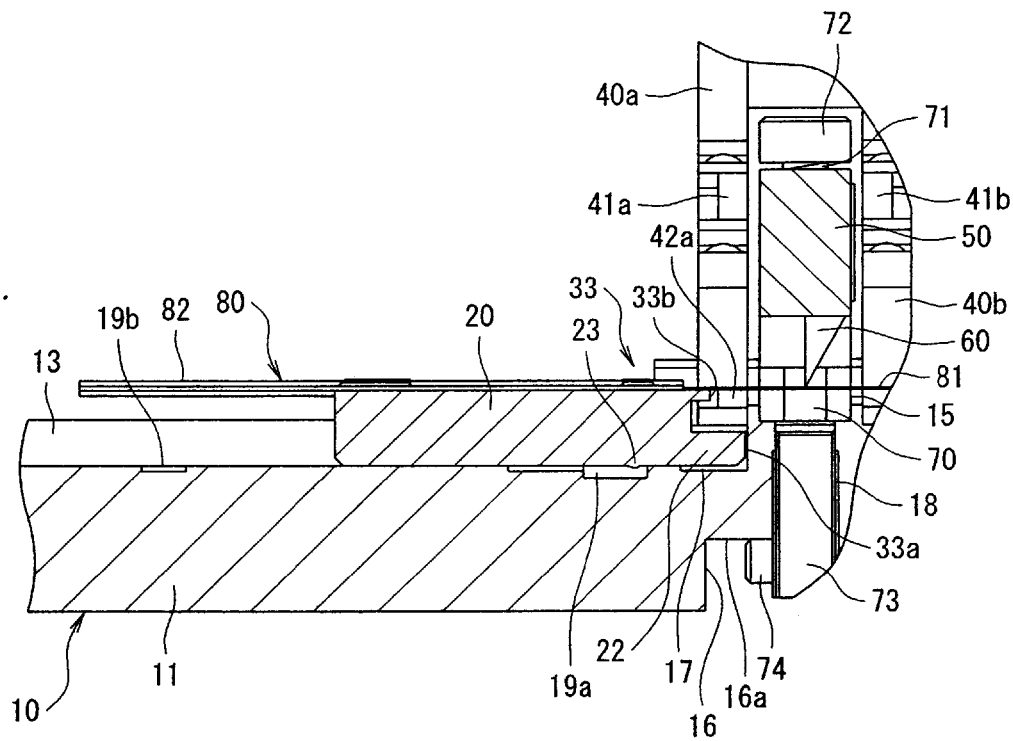

FIG. 11
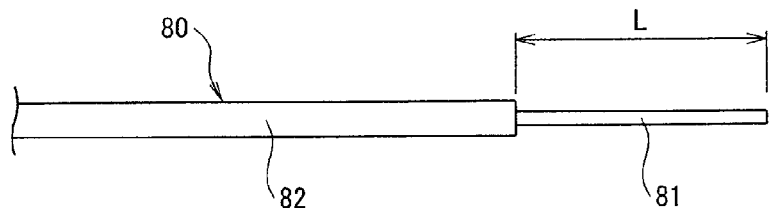
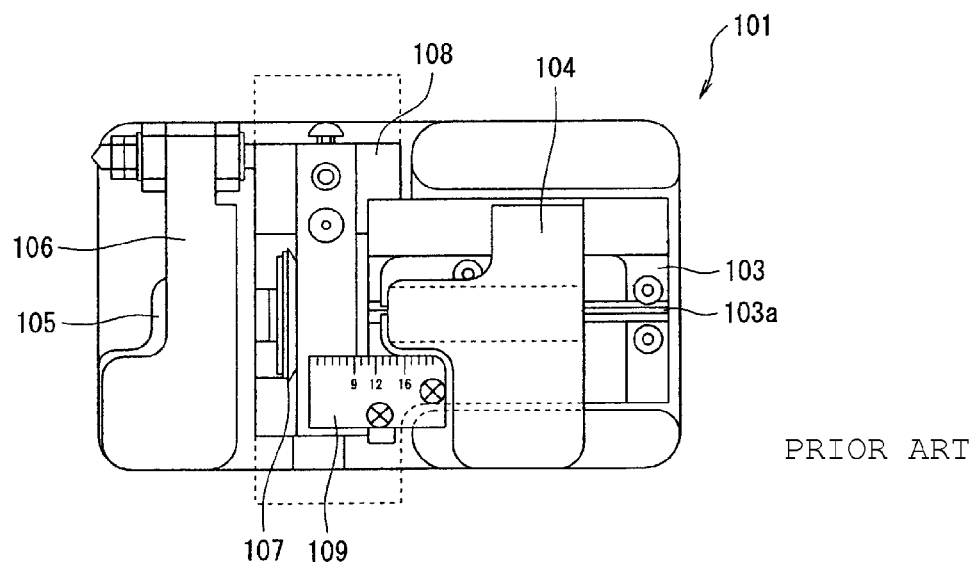
FIG. 12A
PRIOR ART
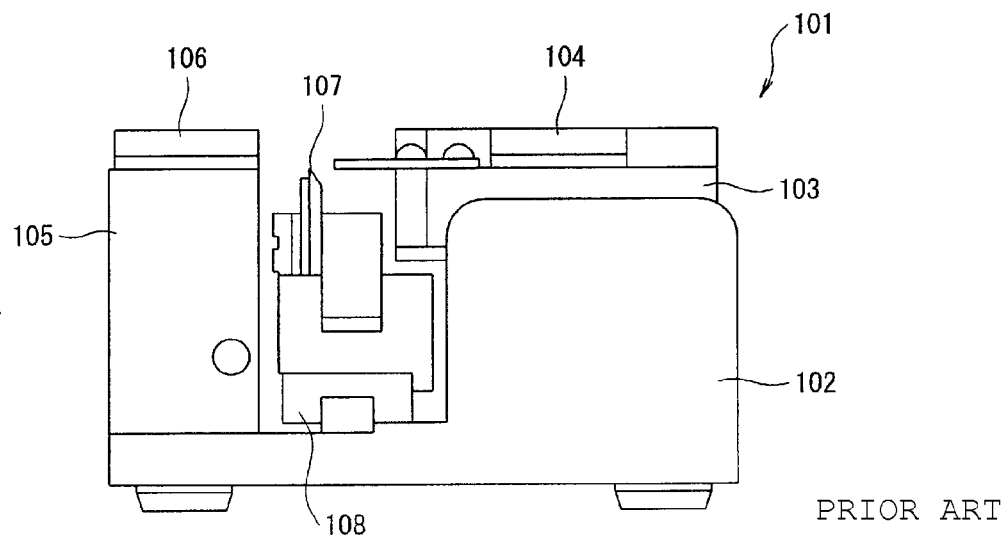
FIG. 12B
PRIOR ART

OPTICAL FIBER CLEAVER

CROSS-REFERENCE TO RELATED APPLICATIONS

This application claims the benefit of the filing date under 35 U.S.C. § 119(a)-(d) of Japanese Patent Application No. 2006-166258, filed Jun. 15, 2006.

FIELD OF THE INVENTION

The present invention relates to the field of optical fiber. More particularly, the present invention relates to cleaving optical fibers.

BACKGROUND

In an optical fiber connection, for example, by welding or the like, cleaving the end surface of each optical fiber is required so that the end surface is at a right angle to the axial direction of the optical fiber, and the surface is flat and smooth to minimize light attenuation through the connection.

The optical fiber cleaver shown in Prior Art FIGS. 12A and 12B, for example, is a conventional optical fiber cleaver (see JP-A-7-81970).

The optical fiber cleaver 101 shown in Prior Art FIGS. 12A and 12B comprises a clamp stand 103 on one end of a base 102 that holds a jacket of a fiber-optic cable (not shown in the figure), a second clamp stand 105 on the other end of the base 102 that holds an optical fiber, and a blade 107 disposed on the base 102 between the clamp stand 103 and the second clamp stand 105 which cleaves the optical fiber.

Guide grooves 103a which receive jackets are formed in the upper surface of the clamp stand 103. Furthermore, a jacket clamp 104 is pivotally attached to the surface of the clamp stand 103 so that the jacket of a fiber-optic cable in the guide groove 103a is pressed and fastened in place by closing the jacket clamp 104. The clamp stand 103 imparts a tensile force in cooperation with the second clamp stand 105 to the fiber-optic cable. Specifically, the clamp stand 103 is slidable toward the blade 107 (axial direction of the optical fiber) during cleaving, and is biased away from the blade 107 by an elastic member (not shown in the figure).

A fiber clamp 106 is pivotally attached to the surface of the second clamp stand 105 so that the optical fiber is fastened by closing the fiber clamp 106.

In addition, the blade 107 is formed as a disk, and is fastened to a slider 108 that slides in a direction perpendicular to the axial direction of the optical fiber. The blade 107 is positioned underneath the optical fiber that is fastened to the clamp stand 103 and fiber clamp 106, so that the blade 107 initially partially cleaves the optical fiber by sliding in the direction perpendicular to the axial direction of the optical fiber.

Furthermore, as is shown in Prior Art FIG. 12A, a scale 109 for setting the cleaving length of an optical fiber is provided on the clamp stand 103.

When an optical fiber is to be cleaved by the optical fiber cleaver 101, the jacket clamp 104 and fiber clamp 106 are first opened, the jacketed part of the fiber-optic cable is fitted into one of the guide grooves 103a, and the optical fiber is placed on the second clamp stand 105. Next, the jacket clamp 104 is closed, and the clamp stand 103 is urged toward the blade 107 and stopped at a specified position. In this state, the fiber clamp 106 is closed. At this point, because the clamp stand 103 is biased away from the blade 107 by the built-in elastic member, a certain amount of tensile force is applied to the optical fiber. Then, when the blade 107 is slid in the direction perpendicular to the optical fiber axial direction, a cut is formed in the optical fiber, and the optical fiber is cleaved by the tensile force described above.

Moreover, the cleaver shown in Prior Art FIG. 13, is another example of a conventional optical fiber cleaver for cleaving optical fibers (see JP-A-2003-165740).

The optical fiber cleaver 201 shown in Prior Art FIG. 13 comprises a main body 202, a cover 203 pivotally attached to the main body 202, a pair of upper and lower clamps 204a, 205a and 204b, 205b that hold the optical fiber of a fiber-optic cable, a blade part 207 that slides in a direction perpendicular to the optical fiber and that initially partially cleaves the optical fiber, a holder 210 that holds the jacketed part of the optical fiber, and a pillow 208 that bends the optical fiber.

Here, the pair of upper and lower clamps 204a, 205a and 204b, 205b are constructed by fitting rubber into a metal stand part. The lower clamps 205a and 205b are installed a specified distance apart along an optical fiber axial direction on one end of the upper portion of the main body 202 while the upper clamps 204a and 204b are installed on the cover 203 in positions facing the lower clamps 205a and 205b.

Furthermore, the blade 207 is disk shaped and is fastened to a slider 206 that slides in a direction perpendicular to the optical fiber. The blade 207 is disposed between the upper and lower clamps 204a, 205a and 204b, 205b.

Moreover, the holder 210 is designed to be attached to a holder guide 209 formed on the other end of the main body 202.

In addition, the pillow 208 is installed on the cover 203, and works in conjunction with the blade 207 so that after the blade 207 initially partially cleaves the optical fiber, the pillow 208 bends the optical fiber and fully cleaves the optical fiber.

When optical fibers are to be cleaved by this optical fiber cleaver 201, the fiber-optic cables are first set in the holder 210, and the jacket at the end portions of the respective fiber-optic cables are removed to expose the optical fibers. Next, the cover 203 is opened, and the holder 210 is attached to the holder guide 209. Then, the cover 203 is closed, and slider 206 is slid causing the blade 207 to initially partially cleave the optical fibers. Then, the pillow 208 bends the optical fibers, causing propagation of the initial partial cleave and ultimately fracturing the optical fibers.

Furthermore, the optical fiber cleaver shown in Prior Art FIGS. 14A and 14B, for example, is another example of a conventional optical fiber cleaver for cleaving optical fibers (see JP-UM-A-63-135304).

The optical fiber cleaver 301 shown in Prior Art FIGS. 14A and 14B is devised as follows: namely, a spring 304 is interposed between a pair of first frames 302 and second frames 303 that can be opened and closed, where opening these frames allows placement of a fiber-optic cable 320 on the carrier 305 of the first frame 302. When the first and second frames 302 and 303 are closed, an optical fiber 322 of the fiber-optic cable 320 is cleaved by a blade 307 and a bending arm 308 while the optical fiber 322 is pressed and held by a press 306.

Here, the carrier 305 comprises a bender holder 310 attached to the free end of the first frame 302, a bender plate 311 having one end is attached to the surface of the bender holder 310, a rubber bender 312 attached to the surface of the bender plate 311, and a fiber guide 313 attached to the other ends of the bender plate 311 and rubber bender 312. Furthermore, a wide groove 314 in which the jacketed part 321 of the fiber-optic cable 320 is accommodated and a narrow groove 315 in which the optical fiber 322 of the fiber-optic cable 320 is accommodated are formed in the fiber guide 313.

Moreover, the blade 307 is attached to the second frame 303 so that this cleaver can swing in a direction perpendicular to an optical fiber axial direction. The blade 307 has the function of initially partially cleaving the optical fiber 322 while the optical fiber 322 of the fiber-optic cable 320 is pressed and held by the press 306 when the first and second frames 302 and 303 are closed.

In addition, the bending arm 308 is attached to the second frame 303. The bending arm 308 is devised as follows: namely, after the blade 307 initially partially cleaves the optical fiber 322, the bending arm 308 presses the fiber guide 313 to flex the carrier 305 downward, thus imparting a bending force to the optical fiber 322. When the optical fiber 322 is bent by the bending arm 308, the initial partial cleave propagates and results in the fracturing of the optical fiber 322.

Furthermore, the optical fiber cleaver shown in Prior Art FIGS. 15A through 15C, for example, is another example of a conventional optical fiber cleaver for cleaving optical fibers (see JP-UM-A-63-21905).

The optical fiber cleaver 401 shown in Prior Art FIGS. 15A through 15C comprises a spring plate 402 and an arm 403 pivotally attached to the spring plate 402. The spring plate 402 is provided with a guide 404 that guides the jacketed part 411 and optical fiber 412 of a fiber-optic cable 410, and a clamp 405 that fastens the end portion of the optical fiber 412 of the fiber-optic cable 410. Moreover, a slider 406 that can slide along the direction of length of the arm 403 is attached to the arm 403. A blade 407 that initially partially cleaves the optical fiber 412 of the fiber-optic cable 410 is provided at the lower end of slider 406. The slider 406 is fastened to a specified position of the arm 403 in a direction of length by a fastening screw 408. In addition, a scale 409 for confirming the position of the slider 406 is provided with markings at 5 mm intervals on a side surface of the arm 403 in the sliding range of the slider 406. Furthermore, a position confirming mark 406a is provided on a side surface of the slider 406, so that the cleaving length of the optical fiber 412 can be confirmed by reading the value of the scale 409 indicated by the position confirming mark 406a.

When the fiber-optic cable 410 is to be cleaved by the optical fiber cleaver 401, the slider 406 is first moved to the position of a target cleaving length and fastened in place, the jacketed part 411 and optical fiber 412 (which is not covered by a jacket) of the fiber-optic cable 410 are set on the spring plate 402 in accordance with the guide 404, and the tip of the optical fiber 412 is pressed by the clamp 405. Next, the blade 407 is pressed against the optical fiber 412 of the fiber-optic cable 410 to initially cleave the optical fiber 412 by pressing the arm 403 down. Next, the blade 407 is released and the spring plate 402 is bent, so that the optical fiber 412 is fully cleaved.

However, the following problems have been encountered in the optical fiber cleaver 101 shown in Prior Art FIGS. 12A and 12B, the optical fiber cleaver 201 shown in Prior Art FIG. 13, the optical fiber cleaver 301 shown in Prior Art FIGS. 14A and 14B, and the optical fiber cleaver 401 shown in Prior Art FIGS. 15A through 15C:

Specifically, in the case of the optical fiber cleaver 101 shown in Prior Art FIGS. 12A and 12B, a certain amount of tensile force is applied to the optical fiber of the fiber-optic cable when the optical fiber is cleaved. Therefore, when the blade 107 is pressed against the optical fiber, there is a concern that the optical fiber may escape from the blade 107. Accordingly, it is difficult to form a stable cleaving in the optical fiber, and there are cases in which the cleaved surface is inclined or ripped which contributes to signal attenuation.

Furthermore, the scale 109 for setting the optical fiber cleaving length is provided on the clamp stand 103, but there is no clear description of how to use the scale 109. Because the cleaving length of the optical fiber refers to the length of the optical fiber of a fiber-optic cable in which the jacket is removed at one end portion, cleaving the optical fiber involves moving the clamp stand 103 in toward the blade 107 after closing the jacket clamp 104. Therefore, the tip end of the jacketed part is hidden when the cleaving length is determined so that the cleaving length of the optical fiber cannot be determined using the scale 109.

Moreover, in the case of the optical fiber cleaver 201 shown in Prior Art FIG. 13, while the blade 207 is fastened to the slider 206, the pillow 208 is installed on the cover 203, undesirably complicating the cleaving mechanism of the optical fiber. Furthermore, the fastening position of the optical fiber by means of the holder 210 is fixed, undesirably limiting cleaving of an optical fiber to a single predetermined length.

In addition, in the case of the optical fiber cleaver 301 shown in Prior Art FIGS. 14A and 14B, because the fiber-optic cable 320 is not fastened on the side of the jacketed part 321, the process of cleaving the optical fiber 322 with blade 307 is unstable, resulting in cleaved surfaces which are inclined or ripped which contributes to signal attenuation. Furthermore, because only a certain location of the blade 307 contacts the optical fiber 322, the blade 307 has a short service life. Moreover, when the carrier 305 is repeatedly flexed downward by the bending arm 308, the rubber bender 312 undergoes plastic deformation into the shape of the letter "V" as a result of the repeated bending action of the rubber bender 312, so that there is a possibility that the blade 307 will no longer contact the optical fiber 322 at a right angle. As a result, cleaving the optical fiber 322 is unstable, resulting in cleaved surfaces which are inclined or ripped which contributes to signal attenuation. In addition, because the fastening position of the fiber-optic cable 320 is fixed, the optical fiber 322 can only be cleaved at a certain length.

Furthermore, in the case of the optical fiber cleaver 401 shown in Prior Art FIGS. 15A-15C, because the fiber-optic cable 410 is not fastened on the side of the jacketed part 411 (the fiber-optic cable 410 is merely guided in the guide 404), cleaving the optical fiber 412 by the blade 407 is unstable, resulting in cleaved surfaces that are inclined or ripped which contributes to signal attenuation. Moreover, because only a certain location of the blade 407 contacts the optical fiber 412, the blade 407 has a short service life. In addition, if the spring plate 402 is repeatedly bent over long-term use, the spring plate 402 undergoes plastic deformation into the shape of the letter "V," so that there is a possibility that the blade 407 will no longer contact the optical fiber 412 at a right angle. As a result, cleaving the optical fiber 412 is unstable, resulting in cleaved surfaces that are inclined or ripped which contributes to signal attenuation. Furthermore, while the cleaving length of the optical fiber 410 can be set and confirmed by reading the value of the scale 409 indicated by the position confirming mark 406a, the process is cumbersome. Specifically, when the cleaving length is to be changed, it is necessary to temporarily loosen the fastening screw 408 to move the cleaver box 406 to the new position in the direction of length of the arm 403, and then to fasten the cleaver box 406 to the arm 403 by tightening the fastening screw 408. This operation is troublesome prevents easy changing of the cleaving length setting.

SUMMARY

Accordingly, the present invention was devised in light of the problems described above, it is an object of the present invention to provide an optical fiber cleaver which makes it possible to obtain a favorable cleaved surface by means of a simple cleaving mechanism and also to set various cleaving lengths easily.

The present invention relates to an optical fiber cleaver having a main body having a channel, a feed block attached to the main body in the channel, the feed block being operable between a front position and a rear position, a length selector for setting an optical fiber cleaving length, the length selector comprising a scale provided on the main body, a display provided on the feed block, and a position indicator operably associated with the scale, a pair of upper and lower clamps which fasten an optical fiber of an optical fiber when the feed block is located in the front position, a slider, a blade carried by the slider, the blade being configured to form an initial partial cleaving, and a push-up member carried by the slider and configured to bend the optical fiber subsequent the initial partial cleaving of the optical fiber.

BRIEF DESCRIPTION OF THE DRAWINGS

in FIG. 1, a state is shown in which the cleaving of optical fibers have been completed, and the upper and lower clamps are opened;

FIG. 8A shows a sectional view along line 8A-8A in FIG. 6 of the optical fiber cleaver in the state shown in FIG. 6;

FIG. 8B shows an enlarged view of the area indicated by arrow 8B in FIG. 8A of the optical fiber cleaver in the state shown in FIG. 6;

FIG. 11 is an explanatory diagram of an optical fiber that has completed the optical fiber cleaving process;

Prior Art FIG. 12A shows a plan view of a conventional optical fiber cleaver;

Prior Art FIG. 12B shows a front view of a conventional optical fiber cleaver;

Prior Art

Prior Art

Prior Art

Prior Art

Prior Art

DESCRIPTION OF THE PREFERRED EMBODIMENT(S)

Next, an embodiment of the present invention will be described with reference to the figures. First, as is shown in FIG. 11, a fiber-optic cable 80 which has been cleaved by an optical fiber cleaver 1 of the present invention comprises a bare or exposed optical fiber 81 which extends from one end of a jacketed part 82 in which the optical fiber 81 is covered by a jacket. Furthermore, the cleaving length of the fiber-optic cable 80 refers to the length L of the optical fiber 81 as shown in FIG. 11.

Figure 1:
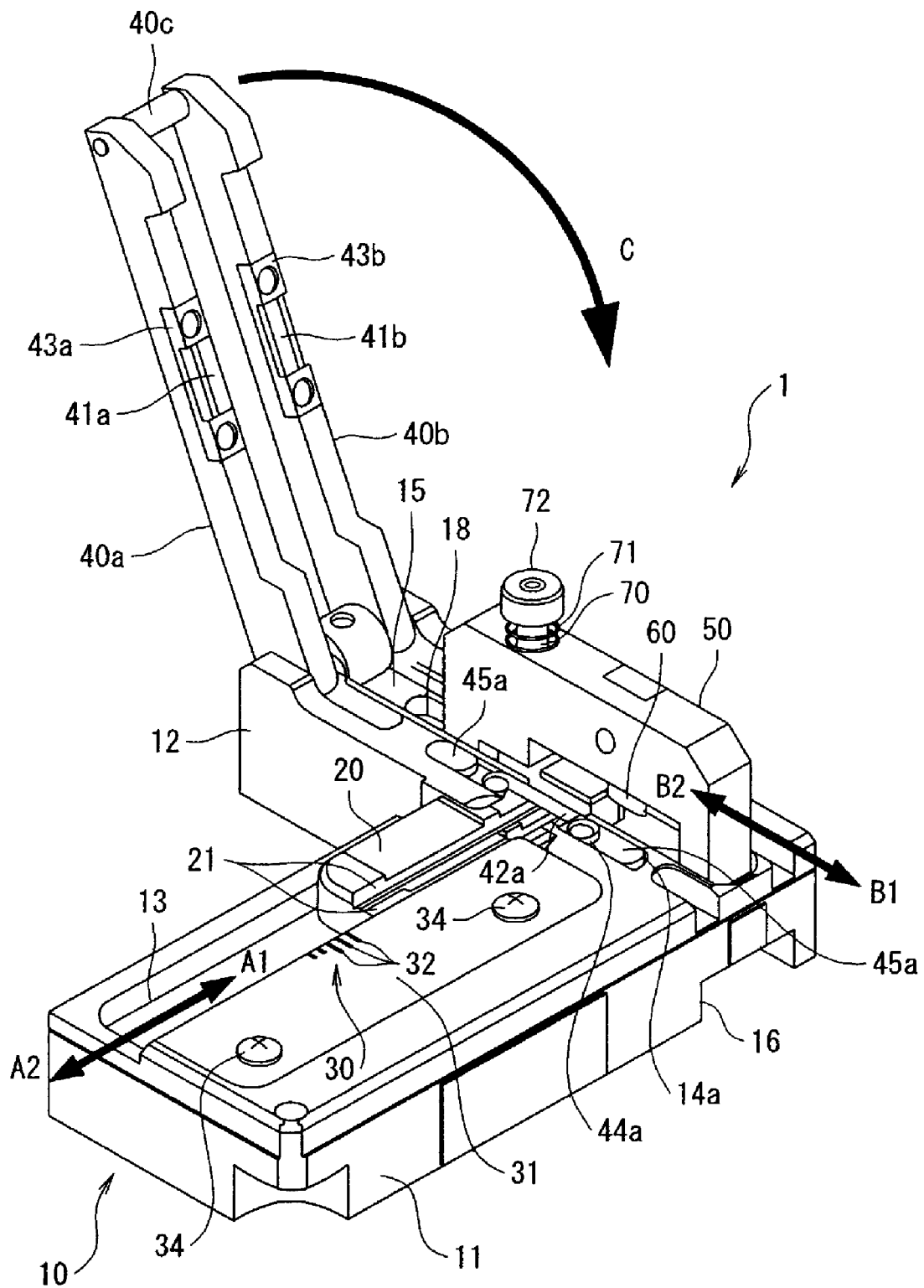
FIG. 1 is a perspective view of the optical fiber cleaver of the present invention.

The optical fiber cleaver 1 shown in FIG. 1 can cleave the optical fiber 81 of the fiber-optic cable 80 to various cleaving lengths (length of the bare optical fiber 81) L. The optical fiber cleaver 1 comprises a main body 10, a feed block 20, a length selector 30, a pair of upper and lower clamps, specifically, first upper clamp 41a, first lower clamp 42a, second upper clamp 41b, and second lower clamp 42b (see FIGS. 2A and 2B), a slider 50, a blade 60, and a push-up member 73 (see FIGS. 9A and 9B) that is linked with a rod 70.

Figure 2A:
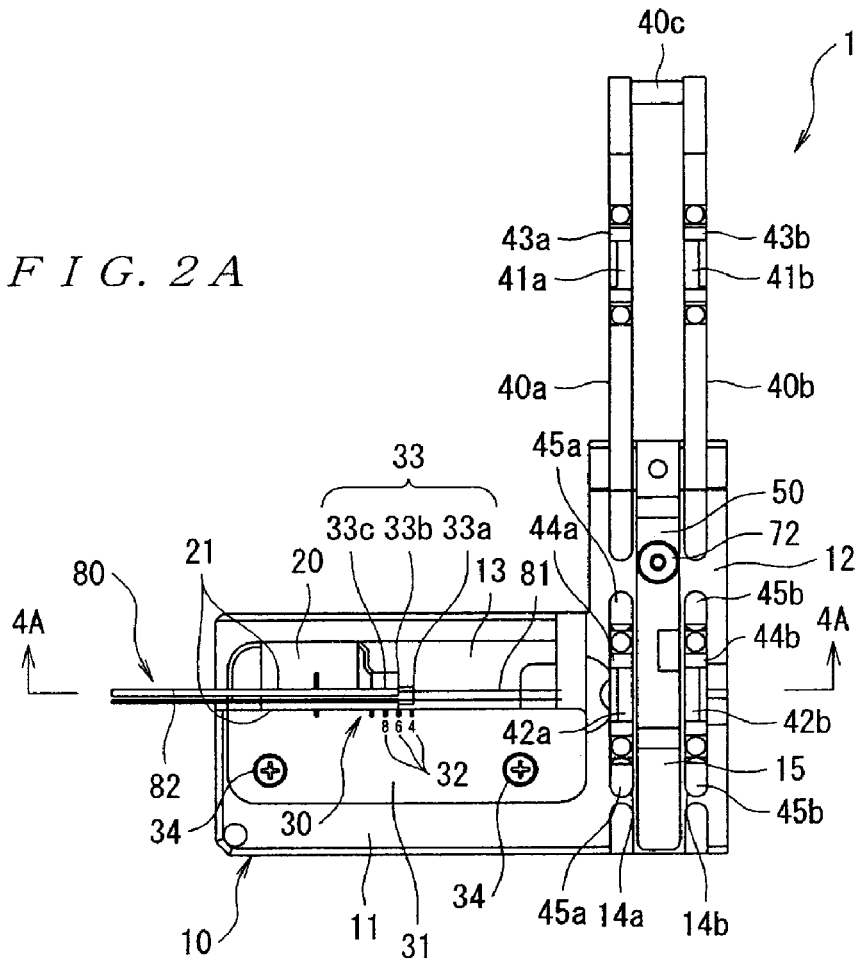
FIG. 2A shows a plan view of the optical fiber cleaver in a state in which the feed block is located in the rear position prior to the cleaving of the optical fibers.
Figure 2B:
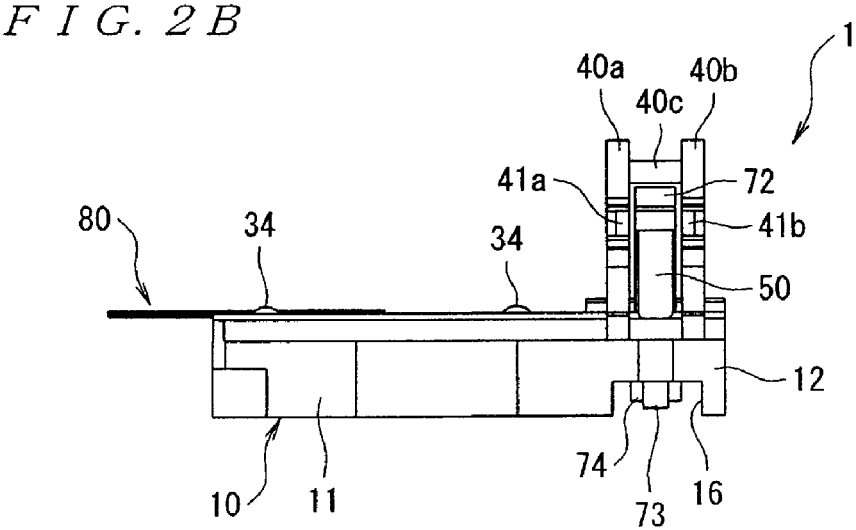
FIG. 2B shows a front view of the optical fiber cleaver in a state in which the feed block is located in the rear position prior to the cleaving of the optical fibers.
Figure 3A:
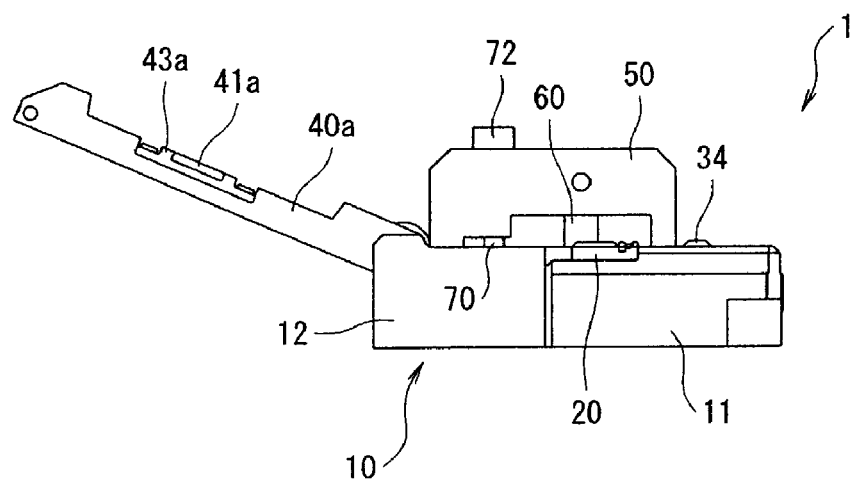
FIG. 3A shows a left side view of the optical fiber cleaver in the state shown in FIGS. 2A and 2B.
Figure 3B:
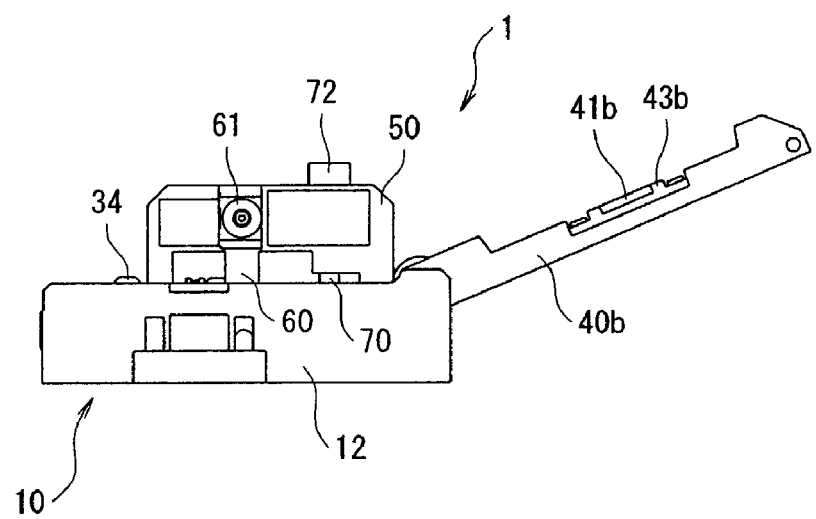
FIG. 3B shows a right side view of the optical fiber cleaver in the state shown in FIGS. 2A and 2B.
Figure 7:
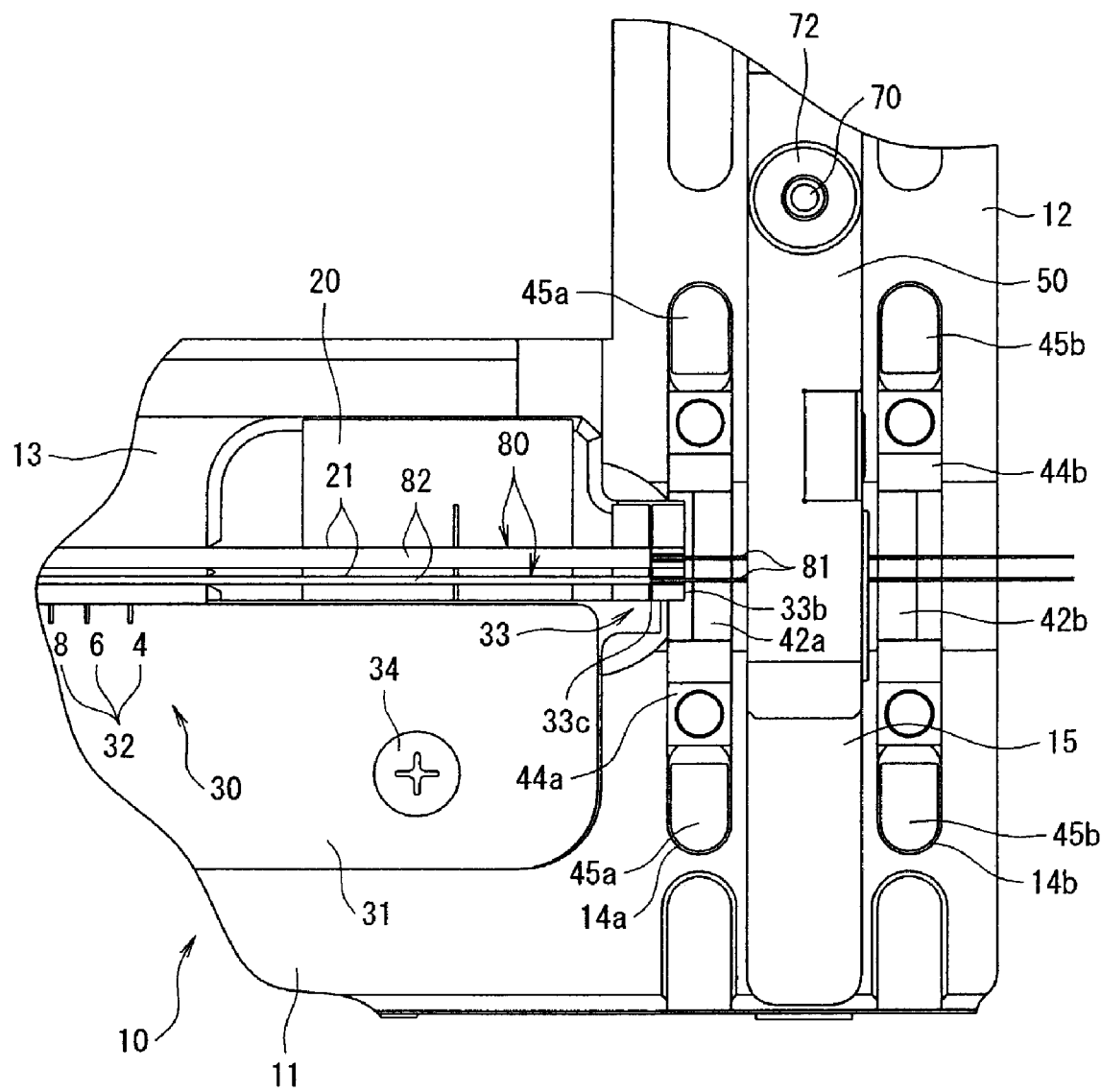
FIG. 7 is an enlarged view of the area indicated by arrow 7 in FIG. 6.

The main body 10 comprises a base 11 that extends in a forward-rearward direction (left-right direction in FIG. 2A; in FIG. 2A, the "right side" is referred to as the "front side," and the "left side" is referred to as the "rear side"), and an arm support 12 that is provided at the front end of the base 11 and that protrudes on the right side ("upper side" in FIG. 2A) of the base 11. A channel 13 that extends in the forward-rearward direction is formed in the base 11. Furthermore, as is shown in FIGS. 2A and 7, a slider groove 15 that extends in the left-right direction is formed substantially in the central portion of the arm support 12 in the forward-rearward direction. Moreover, a first clamp groove 14a that extends in the left-right direction is formed in the arm support 12 on the rear side of the slider groove 15, while a separate second clamp groove 14b is formed on the front side of the slider groove 15.

In addition, a recessed part 16 that extends in the left-right direction is formed in the undersurface of the arm support 12, and a push-up member sliding through-hole 18 that passes through to the recessed part 16 and that extends in the left-right direction is formed in the undersurface of the slider groove 15 in the arm support 12.

Furthermore, the feed block 20 is formed in a substantially rectangular shape, and is mounted inside the channel 13 so that the feed block 20 can slide in the direction indicated by arrows A1 and A2 in FIG. 1 between a front position (see FIGS. 6, 7, 8A and 8B) and a rear position (see FIGS. 2A, 2B, 4A and 4B). As is most clearly shown in FIG. 7, a plurality of jacket grooves 21 (two grooves in the present embodiment) for carrying the jacketed part 82 of fiber-optic cables 80 are formed in the upper surface of the feed block 20 so that these jacket grooves 21 extend in the forward-rearward direction. The jacket grooves 21 are formed so that various fiber-optic cable 80 with different jacket diameters can be carried. A substantially rectangular plate 31 that prevents escape of the feed block 20 mounted in the channel 13 is attached to the upper surface of the main body 10 by a plurality of attachment screws 34. A side surface that extends rectilinearly in the forward-rearward direction is present in the edge portion on the side of the channel 13 of the plate 31, and this edge portion covers the upper portion of a part of the upper surface of the feed block 20, so that the feed block 20 is prevented from escaping. Feed block 20 is be mounted in the channel 13 by inserting the feed block 20 into the channel 13 while the plate 31 is removed and then the plate 31 is attached to the main body 10.

Figure 4A:
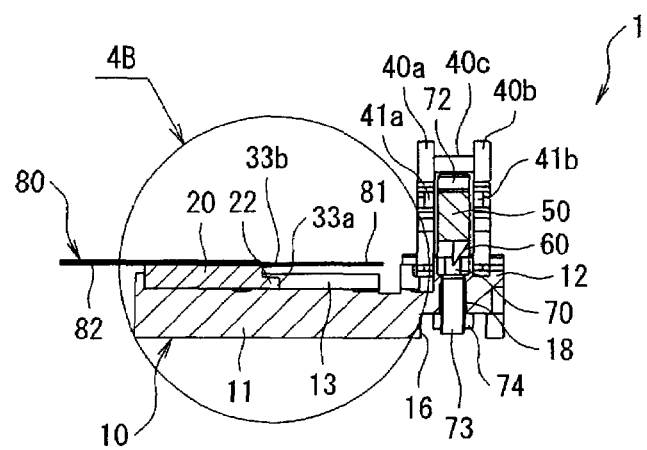
FIG. 4A shows a sectional view along line 4A-4A in FIGS. 2A and 2B of the optical fiber cleaver in the state shown in FIGS. 2A and 2B.
Figure 4B:
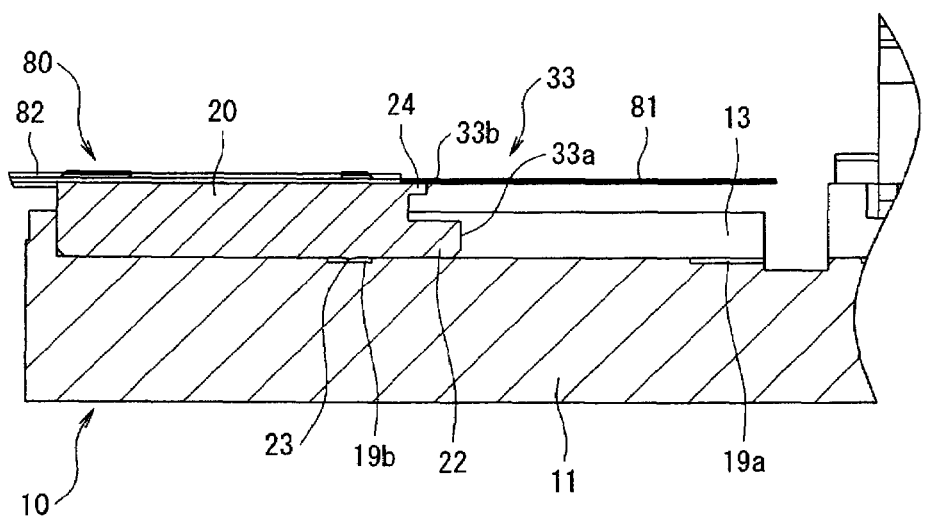
FIG. 4B shows an enlarged view of the area indicated by arrow 4B in FIG. 4A of the optical fiber cleaver in the state shown in FIGS. 2A and 2B.

Moreover, the length selector 30 is constructed from a scale 32 for setting the optical fiber cleaving length and a display 33 having a plurality of position indicators, including first position indicator 33a, second position indicator 33b, and third position indicator 33c. As is shown in FIG. 2A, the scale 32 is inscribed on the upper surface of the edge portion of the plate 31 on the side of the channel 13, and numbers and graduation lines corresponding to a plurality of cleaving lengths are inscribed on the upper surface of this edge portion. In the present embodiment, the number "4" and a graduation line corresponding to a cleaving length of 4 mm, the number "6" and a graduation line corresponding to a cleaving length of 6 mm, and the number "8" and a graduation line corresponding to a cleaving length of 8 mm are successively inscribed from the front side toward the rear side substantially in the central portion of the plate 31 in the forward-rearward direction. As is shown in FIG. 2A, the plurality of position indicators 33a, 33b, and 33c are provided on the front side of the feed block 20 so as to be placed in positions corresponding to the scale 32 for setting the optical fiber cleaving length when the feed block 20 is in the rear position. In the present embodiment, the first position indicator 33a located on the foremost side among the plurality of position indicators 33a, 33b, and 33c is provided in a position corresponding to the number "4" and graduation line that correspond to a cleaving length of 4 mm, the second position indicator 33b is provided in a position corresponding to the number "6" and graduation line that correspond to a cleaving length of 6 mm, and the third position indicator 33c located on the rearmost side is provided in a position corresponding to the number "8" and graduation line that correspond to a cleaving length of 8 mm. In addition, as is shown in FIG. 4B, the first position indicator 33a located on the foremost side is constructed from the lower end surface of a step 22 that protrudes forward from a lower position of the front end surface of the feed block 20, the middle second position indicator 33b is constructed from the front end surface of a shelf 24 that protrudes forward from an upper position of the front end surface of the feed block 20, and the rearmost-side third position indicator 33c is constructed from a groove that is formed in the upper surface of the feed block 20 and that extends in the left-right direction as shown in FIG. 7. The step 22 where the foremost-side first position indicator 33a is located protrudes further forward than the shelf 24 where the middle second position indicator 33b is located, and the upper surface of the step 22 is set lower than the upper surface of the feed block 20, so that the display 33 has a step whose front end is lowered. As is shown in FIG. 8B, the front end of the display 33, i.e., step 22, is designed to fit into a concavity 17 that is formed underneath the first lower clamp 42a of the rear-side upper and lower clamps 41a and 42a among the pair of upper and lower clamps 41a, 42a and 41b, 42b when the feed block 20 is located in the front position.

Figure 5A:
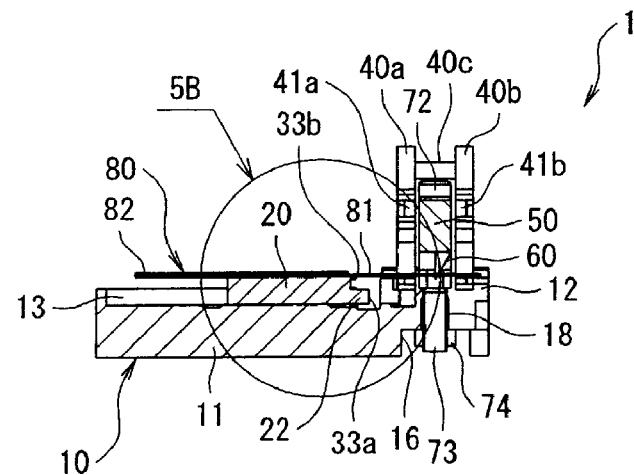
FIG. 5A shows a sectional view corresponding to the sectional view along line 4A-4A in FIGS. 2A and 2B of the optical fiber cleaver in a state in which the feed block is advanced from the rear position prior to the cleaving of the optical fibers.
Figure 5B:
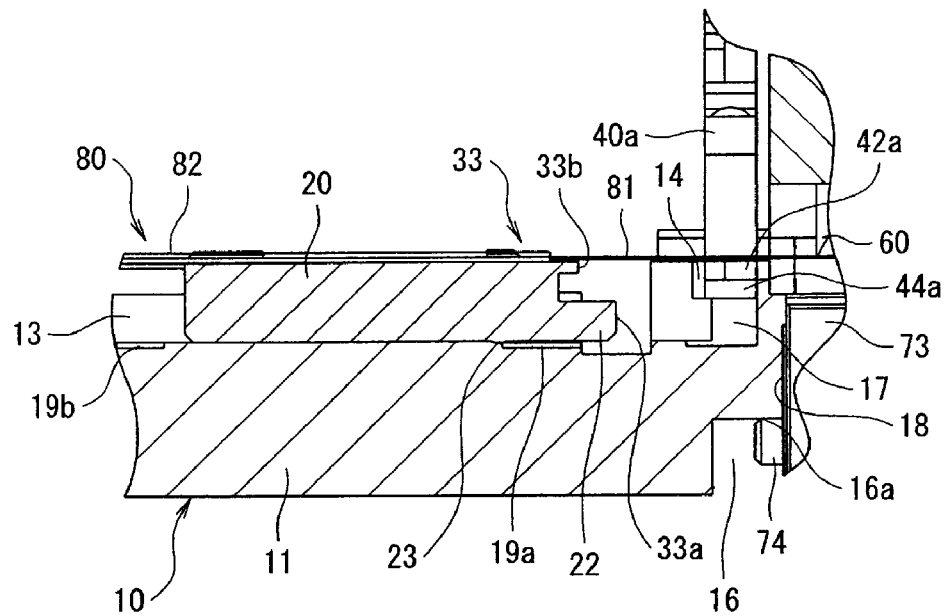
FIG. 5B shows an enlarged view of the area indicated by arrow 5B in FIG. 5A of the optical fiber cleaver in a state in which the feed block is advanced from the rear position prior to the cleaving of the optical fibers.
Figure 6:
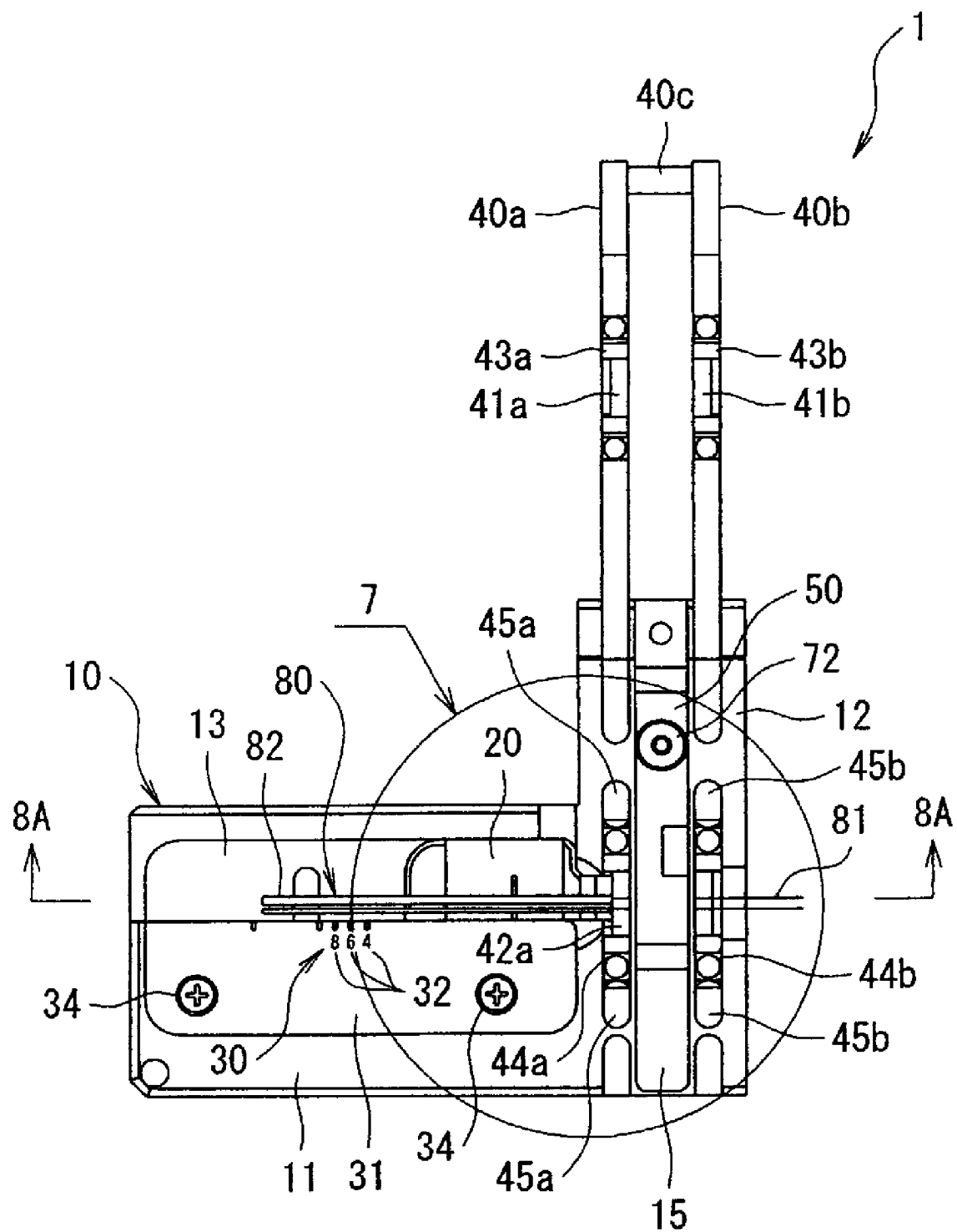
FIG. 6 is a plan view of the optical fiber cleaver in a state in which the feed block is located in the front position prior to the cleaving of the optical fibers.

Furthermore, as is shown in FIGS. 4B, 5B, and 8B, a projection 23 is provided on the bottom surface of the feed block 20 toward the front end. Meanwhile, a front recess 19a that receives the projection 23 when the feed block 20 is moved to the front position is formed in the front portion of the channel 13 in the base 11 as shown in FIG. 8B. Moreover, a rear recess 19b that receives the projection 23 when the feed block 20 is moved to the rear position is formed in the rear portion of the channel 13 in the base 11 as shown in FIG. 4B.

In addition, as is shown in FIGS. 2A and 7, the rear-side first lower clamp 42a attached to a first lower clamp retainer 44a is accommodated in the rear-side first clamp groove 14a in the arm support 12. The first lower clamp 42a is constructed from a sheet member made of rubber, and the installation position in the left-right direction is on an extension of the channel 13 as shown in FIG. 7, and is a position where the optical fiber 81 of the fiber-optic cable 80 carried on the feed block 20 are placed. Furthermore, a pair of first magnets 45a are carried in the first clamp groove 14a on the outside to the left and to the right of the first lower clamp retainer 44a. Meanwhile, the front-side second lower clamp 42b attached to a second lower clamp retainer 44b is received in the front-side second clamp groove 14b in the arm support 12 as shown in FIGS. 2A and 7. The second lower clamp 42b is constructed from a sheet member made of rubber, and the installation position in the left-right direction is on an extension of the channel 13 as shown in FIG. 7, and is where the optical fiber 81 of the fiber-optic cable 80 carried on the feed block 20 is placed. Moreover, a pair of second magnets 45b are carried in the second clamp groove 14b on the outside to the left and to the right of the second lower clamp retainer 44b.

Furthermore, a pair of pivoting arms, first arm 40a and second arm 40b, that are disposed a specified distance apart in the forward-rearward direction are supported in a pivotable manner on the right end of the arm support 12 of the main body 10. The tip ends of these pivoting arms 40a and 40b are linked by a shaft 40c. Moreover, the first upper clamp 41a attached to a first upper clamp retainer 43a is installed on the rear-side first arm 40a. This first upper clamp 41a is installed on the first arm 40a to be in a position superimposed on the first lower clamp 42a when the first arm 40a is pivoted in the direction of arrow C in FIG. 1 to close the upper and lower clamps 41a and 42a. The first upper clamp 41a is constructed from a sheet member made of rubber. Meanwhile, the second upper clamp 41b attached to a second upper clamp retainer 43b is installed on the front-side second arm 40b as well. This second upper clamp 41b is installed on the second arm 40b to be in a position superimposed on the second lower clamp 42b when the second arm 40b is pivoted in the direction of arrow C in FIG. 1 to close the upper and lower clamps 41b and 42b. The second upper clamp 41b is constructed from a sheet member made of rubber. If the pair of pivoting arms 40a and 40b are pivoted in the direction of arrow C in FIG. 1 to close the pair of upper and lower clamps 41a, 42a and 41b, 42b while the feed block 20 is located in the front position, and the optical fiber 81 of the fiber-optic cable 80 is carried on the first lower clamp 42a and second lower clamp 42b, then the optical fiber 81 of the fiber-optic cable 80 that is carried on the first lower clamp 42a and second lower clamp 42b is clamped by the pair of upper and lower clamps 41a, 42a and 41b, 42b and fastened in place. Next, the pair of pivoting arms 40a and 40b are fastened by the first magnets 45a and second magnets 45b.

Figure 9A:
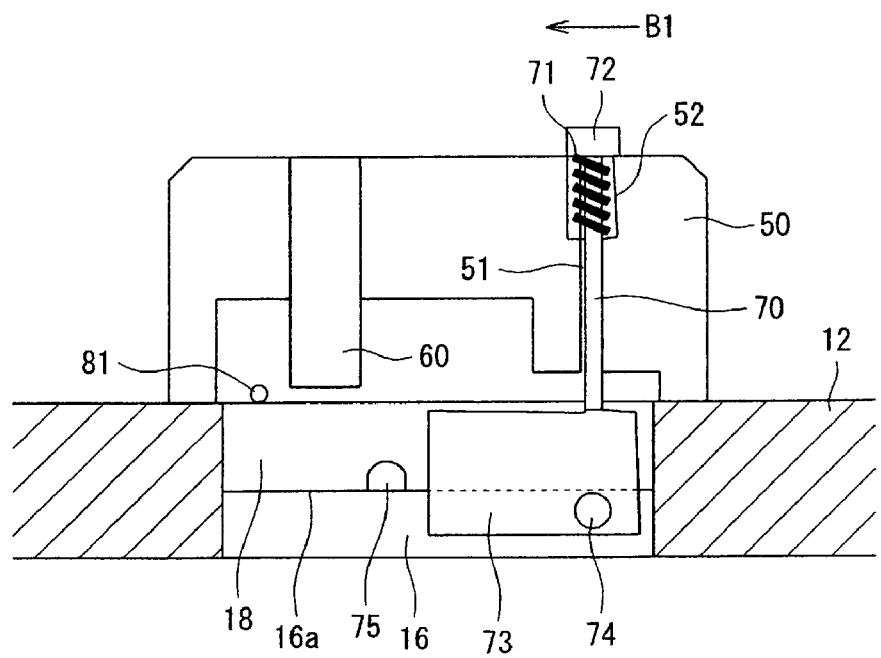
FIG. 9A shows a model diagram when the slider is in a state prior to optical fiber cleaving of the optical fiber cleaving operation by means of the slider and blade.
Figure 9B:
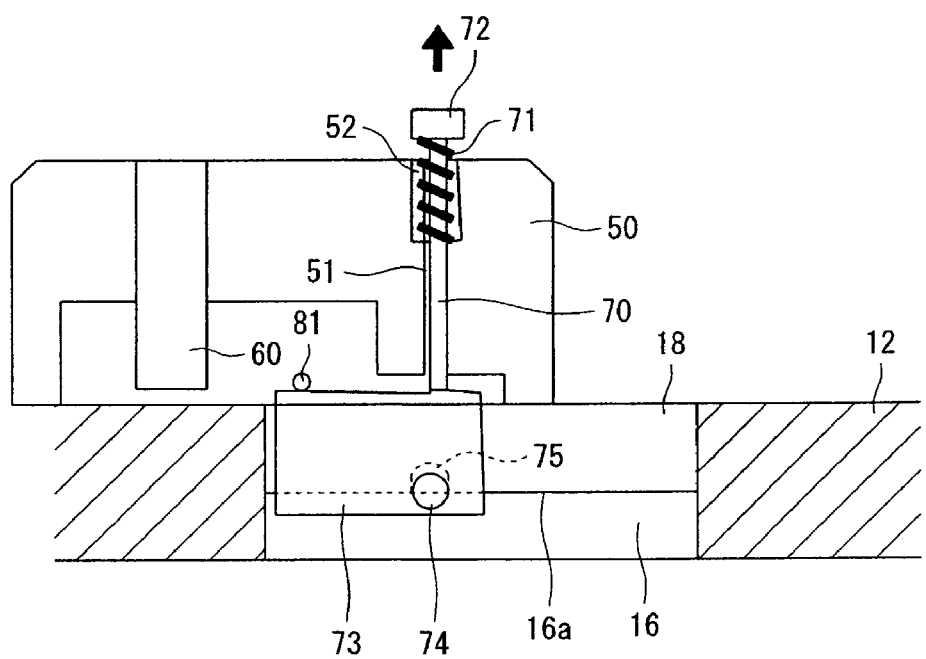
FIG. 9B shows a model diagram when the slider is in a state following optical fiber cleaving of the optical fiber cleaving operation by means of the slider and blade.

The slider 50 is constructed from a substantially upside-down U-shaped member, and is designed to slide in the left-right direction indicated by arrows B1 and B2 in FIG. 1. More specifically, slider 50 is moved in a direction perpendicular to the axial direction of the fiber-optic cable 80 (forward-rearward direction) with the leg parts of the slider 50 within the slider groove 15 of the arm support 12. As is shown in FIGS. 9A and 9B, a vertical rod through-hole 51 is formed in the slider 50. A spring recess 52 is formed on the upper side of the rod through-hole 51 in a continuous manner and has a diameter greater than that of the rod through-hole 51. Furthermore, the width of the slider 50 in the forward-rearward direction is smaller than the distance between the pair of pivoting arms 40a and 40b.

Moreover, as is shown in FIGS. 1, 9A, and 9B, the blade 60 is fastened to the slider 50, and is designed to form an initial partial cleaving in the portion of the optical fiber 81 fastened between the upper and lower clamps 41a, 42a and 41b, 42b when the slider 50 slides in the leftward direction indicated by arrow B1.

In addition, the rod 70 is received in the rod through-hole 51 of the slider 50 and can move in the vertical direction. The push-up member 73 is connected to the lower end of the rod 70. A spring 71 that is disposed inside the spring recess 52 is provided around the upper end of the rod 70. Further, a spring pressing screw 72 is attached to the upper end of the rod 70. The push-up member 73 is provided in a slidable manner inside the push-up member sliding through-hole 18 of the arm support 12, and is biased upward by the spring 71. A pin 74 that protrudes in the forward-rearward direction from the push-up member 73 is provided in the lower portion of the push-up member 73. As is shown in FIG. 9A, prior to the formation of the initial cleaving in the optical fiber 81 by the blade 60, the upward movement of this push-up member 73 is restricted by the pin 74 contacting the upper surface 16a of the recessed part 16 in the arm support 12. However, as is shown in FIG. 9B, following the formation of the initial cleaving in the optical fiber 81 by the blade 60, the push-up member 73 moves upward as a result of the pin 74 entering a groove 75 formed in the upper surface 16a of the recessed part 16 of the arm support 12. Consequently, the optical fiber 81 is bent from below, so that the optical fiber 81 is fully cleaved. Specifically, the push-up member 73 is provided on the slider 50, and works in conjunction with the blade 60 so that after the blade 60 forms the initial cleaving of the optical fiber 81, the push-up member 73 bends the optical fiber 81 and fully cleaves the optical fiber 81.

Next, a method for cleaving the optical fiber 81 of the fiber-optic cable 80 will be described with reference to FIGS. 1, 2A, 2B, 3A, 3B, 4A, 4B, 5A, 5B, 6, 7, 8A, 8B, 9A, 9B, 10A, and 10B.

First, as shown in FIGS. 2A, 2B, 3A, 3B, 4A, and 4B, the pair of pivoting arms 40a and 40b are opened, the slider 50 is slid toward the right end portion of the arm support 12, and the feed block 20 is positioned in the rear position. In this state, the first position indicator 33a that is located on the foremost side of the plurality of position indicators 33a, 33b, and 33c is located in a position corresponding to the number "4" and graduation line that corresponds to a cleaving length of 4 mm on the scale 32, the second position indicator 33b is located in a position corresponding to the number "6" and graduation line that corresponds to a cleaving length of 6 mm on the scale 32, and the third position indicator 33c located on the rearmost side is located in a position corresponding to the number "8" and graduation line that corresponds to a cleaving length of 8 mm. Furthermore, as is shown in FIG. 4B, the projection 23 provided on the bottom surface of the feed block 20 is received by the rear recess 19b in the channel 13.

Next, as is shown in FIG. 2A, the jacketed part 82 is placed in the jacket groove 21 in the feed block 20, with the optical fiber 81 facing toward the front. In this case, the tip end surface of the jacketed part 82 of the fiber-optic cable 80 is positioned at the position display part that is located in a position corresponding to a desired cleaving length among the position display parts 33a, 33b, and 33c of the display 33 located in positions corresponding to the scale 32 for setting the optical fiber cleaving length as shown in FIG. 2A. In the case of FIG. 2A (most clearly shown in FIG. 7), the tip end surface of the jacketed part 82 of fiber-optic cable 80 is positioned at the third position indicator 33c, so that the cleaving length is set at 8 mm. As a result, a desired cleaving length is set. When setting the cleaving length, it is sufficient only if the tip end surface of the jacketed part 82 of the fiber-optic cable 80 is positioned at the position display part of the display 33, so that various cleaving lengths can easily be set. Moreover, altering the cleaving length can also be accomplished easily.

Furthermore, when the feed block 20 is moved to the rear position, the projection 23 provided on the bottom surface of the feed block 20 is received in the rear recess 19b, so that the feed block 20 is oriented horizontally with respect to the bottom surface of the channel 13. Accordingly, the display of the display 33 functions accurately.

When the setting of the cleaving length of the optical fiber 81 of the fiber-optic cable 80 is completed, the feed block 20 is moved as shown in FIGS. 5A and 5B (in the direction of arrow A1 shown in FIG. 1) while pressing the jacketed part 82 of the fiber-optic cable 80 on the feed block 20 with one hand. In this case, as is shown in FIG. 5B, the projection 23 provided on the bottom surface toward the front end of the feed block 20 exits the rear recess 19b, and slides over the bottom surface of the channel 13, and the feed block 20 is inclined with respect to the bottom surface of the channel 13 so that the front end of the feed block 20 is slightly raised. As a result, the tip end of the optical fiber 81 of the fiber-optic cable 80 is suspended at an inclination with respect to the first lower clamp 42a to prevent a collision between the tip end of the optical fiber 81 and the first lower clamp 42a.

Moreover, the feed block 20 is moved further while pressing the jacketed part 82 of the fiber-optic cable 80 on the feed block 20 with the same hand, and the feed block 20 is positioned in the front position as shown in FIGS. 6, 7, 8A and 8B. Then, the projection 23 provided on the bottom surface toward the front end of the feed block 20 enters the front recess 19a, so that the feed block 20 is oriented horizontally with respect to the bottom surface of the channel 13. In this position, the tip end of the optical fiber 81 of the fiber-optic cable 80 is oriented horizontally with respect to the first lower clamp 42a. In this position, the advanced position of the feed block 20 can be ascertained. Also in this position, the optical fiber 81 is carried on the lower clamps 42a and 42b.

Furthermore, when the feed block 20 is located in the front position, the front end of the display 33, i.e., the step 22 where the foremost-side first position indicator 33a is located, fits into the concavity 17. The concavity 17 is formed underneath the first lower clamp 42a of the rear-side upper and lower clamps 41a and 42a among the pair of upper and lower clamps 41a, 42a and 41b, 42b as shown in FIG. 8B. Accordingly, collisions between the front end of the display 33 and the first lower clamp 42a are avoided. Consequently, by positioning the tip end surface of the jacketed part 82 of the fiber-optic cable 80 at the first position indicator 33a when the feed block 20 is in the rear position, it is possible to set the cleaving length (4 mm) according to the scale 32 corresponding to the first position indicator 33a located at the front end.

Moreover, when the optical fiber 81 is carried on the lower clamps 42a and 42b, the pair of pivoting arms 40a and 40b pivot in the direction of arrow C in FIG. 1 to close the pair of upper and lower clamps 41a, 42a and 41b, 42b. Next, the optical fiber 81 of the fiber-optic cable 80 carried on the lower clamps 42a and 42b is clamped by the pair of upper and lower clamps 41a, 42a and 41b, 42b and held in place. Next, the pair of pivoting arms 40a and 40b are held in place by the first magnets 45a and second magnets 45b.

Next, as is shown in FIG. 9A, the slider 50 is slid in the leftward direction indicated by arrow B1 (direction perpendicular to the axial direction of the fiber-optic cable 80). Then, the blade 60 fastened to the slider 50 forms an initial partial cleaving in the portion of the optical fiber 81 in the area fastened between the pair of upper and lower clamps 41a, 42a and 41b, 42b. Following the initial partial cleaving of the optical fiber 81 by the blade 60, the pin 74 enters the groove 75 formed in the upper surface 16a of the recessed part 16 of the arm support 12, and moves upward as shown in FIG. 9B. Accordingly, the push-up member 73 bends the optical fiber 81 from below, so that the optical fiber 81 is fully cleaved. This process results in a fiber-optic cable 80 having an optical fiber 81 of a desired length L such as that shown in FIG. 11.

By fastening the optical fiber 81 with the pair of upper and lower clamps 41a, 42a and 41b, 42b, during the initial partial cleaving and subsequently bending to the optical fiber 81 with the push-up member 73, the cleaved surfaces of the optical fiber 81 are not inclined and there is no ripping in the end portions of the cleaved surfaces, which is favorable for preventing signal attenuation at the cleaved surface.

Furthermore, because the blade 60 and push-up member 73 are integrally provided on the slider 50, the cleaving mechanism is simple. Also, since different parts of the blade 60 will contact optical fibers 81, wear of the blade 60 is reduced and the service life of the blade 60 is increased.

Figure 10A:
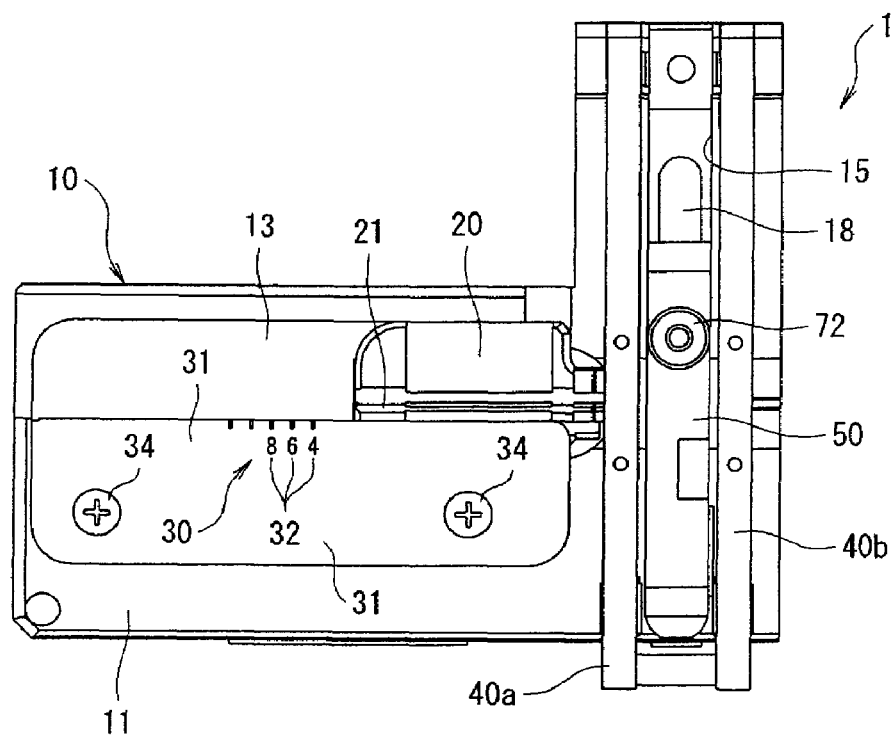
FIG. 10A shows a plan view of the optical fiber cleaver in a state in which the optical fiber cleaving has been completed, and the upper and lower clamps are closed.
Figure 10B:
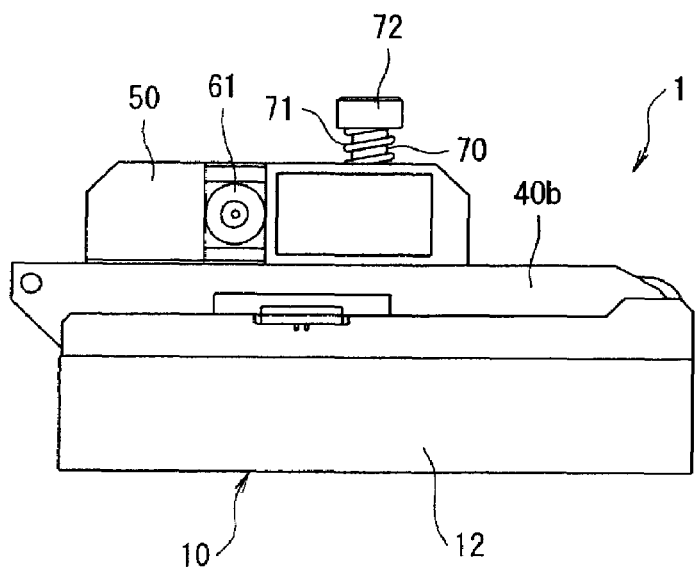
FIG. 10B shows a right side view of the optical fiber cleaver in a state in which the optical fiber cleaving has been completed, and the upper and lower clamps are closed.
Figure 13:
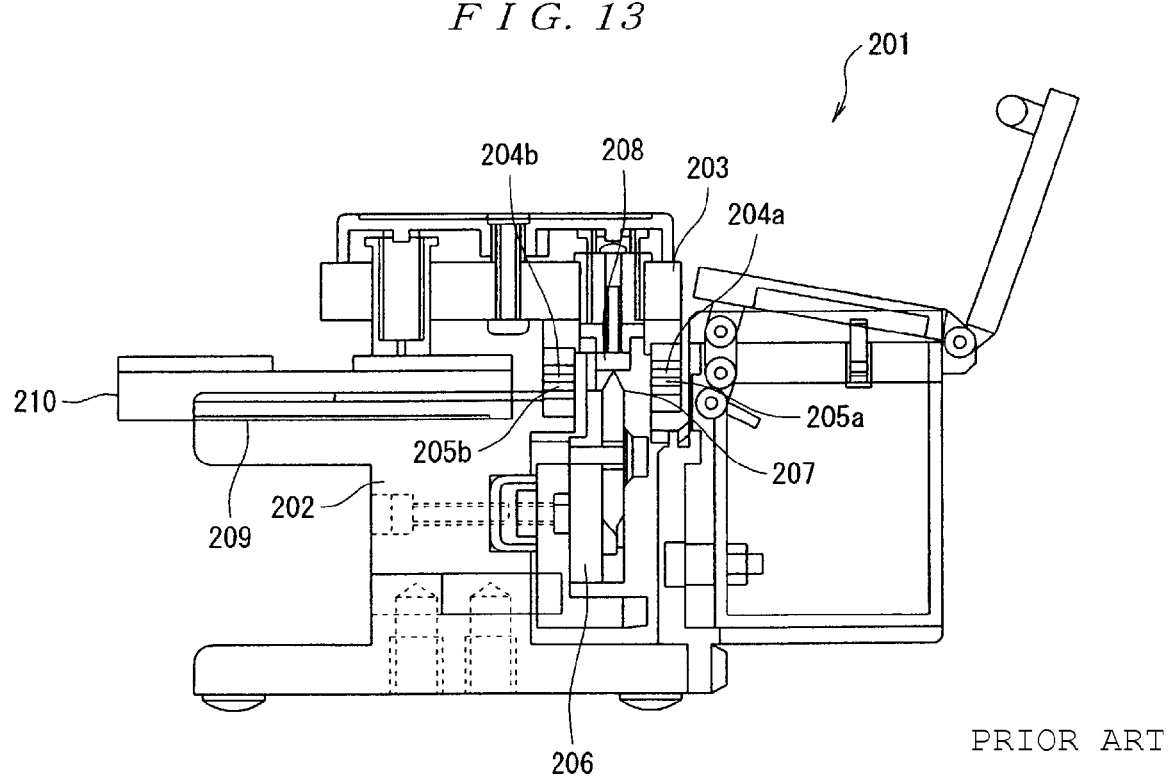
FIG. 13 is a front view of another conventional example of an optical fiber cleaver.
Figure 14A:
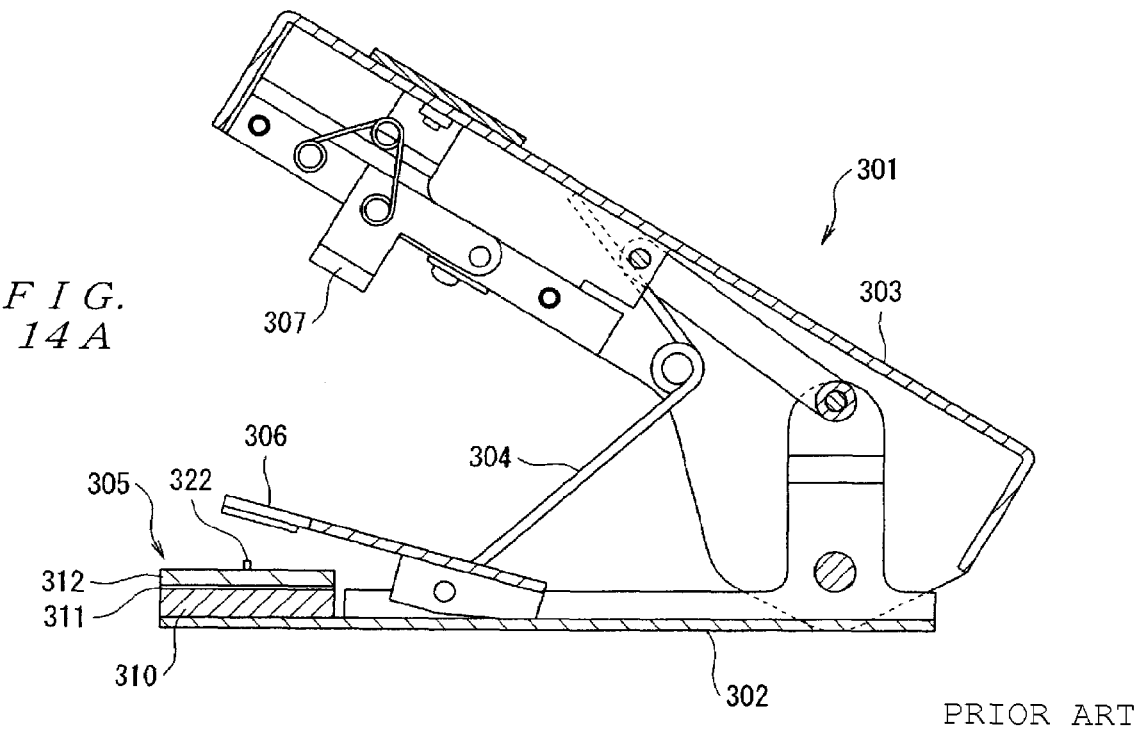
FIG. 14A shows a sectional side view of yet another conventional example of an optical fiber cleaver.
Figure 14B:
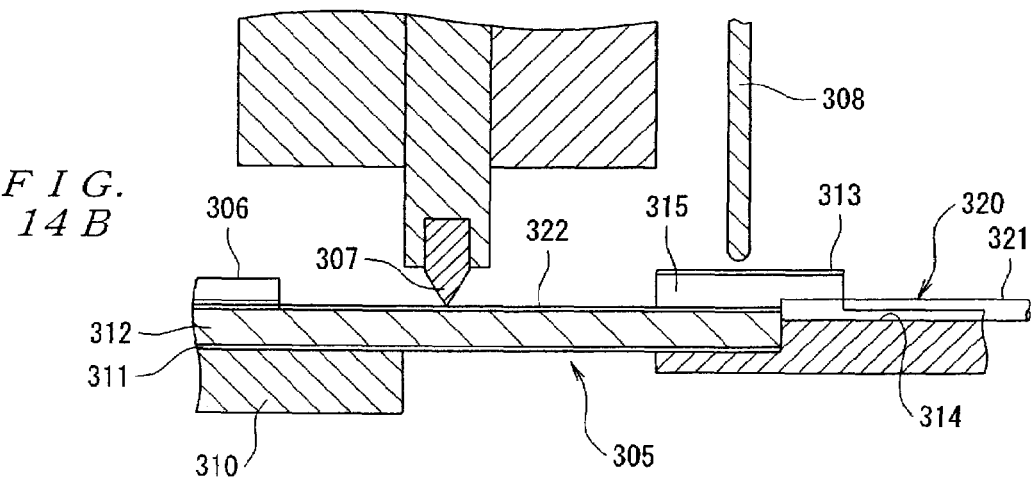
FIG. 14B shows an operating explanatory diagram of the conventional optical fiber cleaver of Prior Art FIG. 14A.
Figure 15A:
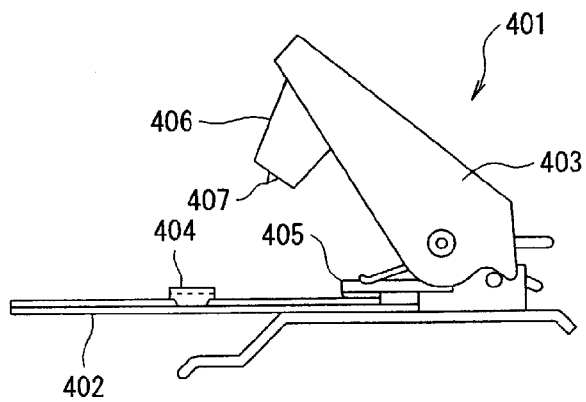
FIG. 15A shows a basic structural diagram of another conventional example of an optical fiber cleaver.
Figure 15B:
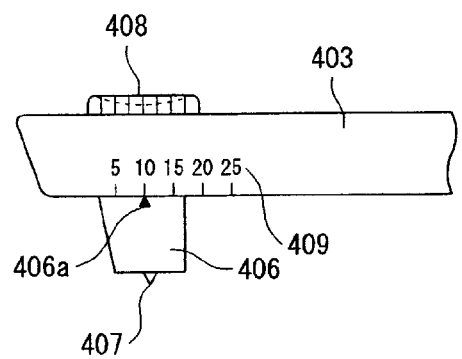
FIG. 15B shows an explanatory diagram in the vicinity of the arm of the conventional optical fiber cleaver of Prior Art FIG. 15A; and Prior Art
Figure 15C:
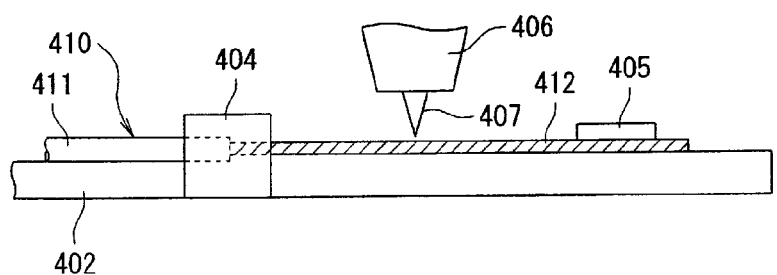
FIG. 15C shows an explanatory diagram of the optical fiber cleaving operation of the conventional optical fiber cleaver of Prior Art FIG. 15A.

The optical fiber cleaver 1 in a state where cleaving of the optical fiber 81 of the fiber-optic cable 80 has been completed is shown in FIGS. 10A and 10B. When the cleaving of the optical fiber 81 is completed, the pair of pivoting arms 40a and 40b are pivoted in the direction opposite from the direction of arrow C to open the pair of upper and lower clamps 41a, 42a and 41b, 42b as shown in FIG. 1. As a result, the optical fiber 81 is released so that the fiber-optic cable 80 can be removed from the optical fiber cleaver 1.

Subsequently, the slider 50 is returned to the original position by moving the slider in the direction of arrow B2 shown in FIG. 1. When the feed block 20 is retracted in the direction of arrow A2 and positioned in the original rear position, the optical fiber cleaver 1 is ready to receive another fiber-optic cable 80 for cleaving.

An embodiment of the present invention has been described above. However, the present invention is not limited to this embodiment, and various alterations or modifications can be made.

For example, it is sufficient for the scale 32 merely to have numbers and graduation lines corresponding to a plurality of cleaving lengths; the scale 32 is not limited to the number "4" and a graduation line that correspond to a cleaving length of 4 mm, the number "6" and a graduation line that correspond to a cleaving length of 6 mm, and the number "8" and a graduation line that correspond to a cleaving length of 8 mm. Furthermore, it is sufficient if the plurality of position indicators 33a, 33b, and 33c are provided on the feed block 20 to be in positions corresponding to the scale 32 for setting the optical fiber cleaving length when the feed block 20 is located in the rear position; these position indicators are not limited to three position indicators 33a, 33b, and 33c.

Moreover, the feed block may alternatively be guided by a rail provided on the main body 10 instead of channel 13. In addition, it would also be possible to provide clamps that can be opened and closed and that hold the jacketed part 82 on the feed stand 20 in order to prevent the positional deviation of the fiber-optic cable 80 on the feed stand 20 when the fiber-optic cable 80 is moved to the front position.

What is claimed is:

1. An optical fiber cleaver, comprising:
    a main body having a channel extending in a forward-rearward direction;
    a feed block attached to the main body in the channel, the feed block being operable between a front position and a rear position;
    a length selector for setting an optical fiber cleaving length, the length selector comprising a scale provided on the main body, a display provided on the feed block, and a position indicator operably associated with the scale when the feed block is in the rear position;
    a pair of upper and lower clamps which fasten an optical fiber of a fiber-optic cable when the feed block is located in the front position;
    a slider movable in a direction generally perpendicular to an axial direction of an optical fiber fastened between the pair of upper and lower clamps;
    a blade carried by the slider, the blade being configured to form an initial partial cleaving in the optical fiber fastened between the pair of upper and lower clamps; and
    a push-up member carried by the slider and configured to bend the optical fiber subsequent the initial partial cleaving of the optical fiber.

2. The optical fiber cleaver according to claim 1, wherein the display comprises a step configured for at least partial insertion into a concavity below a lower clamp.

3. The optical fiber cleaver according to claim 1, wherein a projection is provided on the feed block and a front recess of the channel receives the projection when the feed block is in the front position.

4. The optical fiber cleaver according to claim 3, wherein a rear recess of the channel receives the projection when the feed block is in the rear position.

5. The optical fiber cleaver according to claim 1, wherein the feed block slides within the channel.

6. The optical fiber cleaver according to claim 1, wherein the pair of upper and lower clamps are at least partially held in a position through the use of a magnet.

7. The optical fiber cleaver according to claim 1, wherein the position indicator is provided on a step that protrudes from a lower portion of the front of the feed block.

8. The optical fiber cleaver according to claim 1, wherein the position indicator is provided on a shelf that protrudes from an upper portion of the front of the feed block.

9. The optical fiber cleaver according to claim 1, wherein the position indicator is a groove formed in an upper surface of the feed block.

10. The optical fiber cleaver according to claim 1, wherein the pair of upper and lower clamps are at least partially constructed of rubber.

11. The optical fiber cleaver according to claim 1, wherein a spring causes the push-up member to bend the optical fiber subsequent the initial partial cleaving of the optical fiber.

12. The optical fiber cleaver according to claim 11, wherein the spring is prevented from causing the push-up member to bend the optical fiber subsequent the initial cleaving of the optical fiber until a pin associated with the push-up member moves upward into a groove.

* * * * *